US009665617B1

United States Patent
Long et al.

(10) Patent No.: US 9,665,617 B1
(45) Date of Patent: May 30, 2017

(54) METHODS AND SYSTEMS FOR GENERATING A STABLE IDENTIFIER FOR NODES LIKELY INCLUDING PRIMARY CONTENT WITHIN AN INFORMATION RESOURCE

(71) Applicant: Google Inc., Mountain View, CA (US)

(72) Inventors: Thomas James Worthington Long, London (GB); Pieter Senster, London (GB)

(73) Assignee: Google Inc., Mountain View, CA (US)

( * ) Notice: Subject to any disclaimer, the term of this patent is extended or adjusted under 35 U.S.C. 154(b) by 550 days.

(21) Appl. No.: 14/254,349

(22) Filed: Apr. 16, 2014

(51) Int. Cl.
*G06F 7/00* (2006.01)
*G06F 17/30* (2006.01)

(52) U.S. Cl.
CPC .. *G06F 17/30424* (2013.01); *G06F 17/30864* (2013.01); *G06F 17/30867* (2013.01)

(58) Field of Classification Search
CPC ......... G06F 17/30864; G06F 17/30867; G06F 17/30424
USPC ....................................................... 707/748
See application file for complete search history.

(56) References Cited

U.S. PATENT DOCUMENTS

| | | | | |
|---|---|---|---|---|
| 8,612,450 | B1 * | 12/2013 | Proffit | G06F 17/30817 707/740 |
| 2005/0108630 | A1 * | 5/2005 | Wasson | G06F 17/241 715/230 |
| 2008/0139191 | A1 * | 6/2008 | Melnyk | G06F 17/30905 455/419 |
| 2009/0234861 | A1 * | 9/2009 | Ramer | G06F 17/30749 |
| 2012/0089903 | A1 * | 4/2012 | Liu | G06F 17/30905 715/234 |

(Continued)

FOREIGN PATENT DOCUMENTS

CA    2706743    9/2010

OTHER PUBLICATIONS

International Search Report & Written Opinion on PCT/US2015/025326 dated Jun. 29, 2015.

(Continued)

*Primary Examiner* — Kris MacKes
*Assistant Examiner* — Lin Lin Htay
(74) *Attorney, Agent, or Firm* — Foley & Lardner LLP; John D. Lanza

(57) ABSTRACT

Systems and methods of generating a stable identifier for nodes likely to include primary content of an information resource are disclosed. A processor identifies, on an information resource, a plurality of content-related Document Object Model (DOM) nodes based on a primary content detection policy including one or more rules. The processor determines one or more container nodes containing one or more of the identified content-related DOM nodes. The processor generates, for each of the container nodes, one or more identifiers corresponding to the container node. The processor then determines, for each of the generated identifiers, one or more container nodes to which the identifier corresponds. The processor identifies, from the generated identifiers, a subset of the generated identifiers that correspond only to container nodes that contain the content-related DOM nodes and selects one of the identifiers of the subset as a stable identifier.

18 Claims, 7 Drawing Sheets

(56) References Cited

U.S. PATENT DOCUMENTS

| | | | | |
|---|---|---|---|---|
| 2012/0124464 A1* | 5/2012 | Im | ........................ | G06F 17/227 |
| | | | | 715/236 |
| 2012/0226776 A1* | 9/2012 | Keebler | ............ | G06F 17/30578 |
| | | | | 709/217 |
| 2012/0297025 A1* | 11/2012 | Zeng | ................. | G06F 17/30864 |
| | | | | 709/217 |

OTHER PUBLICATIONS

Vineel G: "Web page DOM node characterization and its application to page segmentation", Internet Multimedia Services Architecture and Applications (IMSAA), 2009 IEEE International Conference on, IEEE, Piscataway, NJ, USA, Dec. 9, 2009 (Dec. 9, 2009), pp. 1-6, XP031653478, ISBN: 978-1-4244-4792-3 the whole document.
Plugin Directory, Ad Injection, Screenshots, Searched Mar. 2014 via online at http://wordpress.org/plugins/ad-injection/screenshots/.
Plugin Directory, Ad Injection, Searched Mar. 2014 via online at http://wordpress.org/plugins/ad-injection/.
Plugin Directory, User Tomhanna Adding Ads to Wordpress, Searched Mar. 2014 via online at http://codex.wordpress.org/User:Tomhanna/Adding_Ads_to_Wordpress.
WordPress in Post Ads Plugin WPMU DEV, 4 pgs, Searched Mar. 2014, via https://premium.wpmudev.org/project/in-post-ads/#detail.
International Preliminary Report on Patentability PCT/US2015/025326.

* cited by examiner

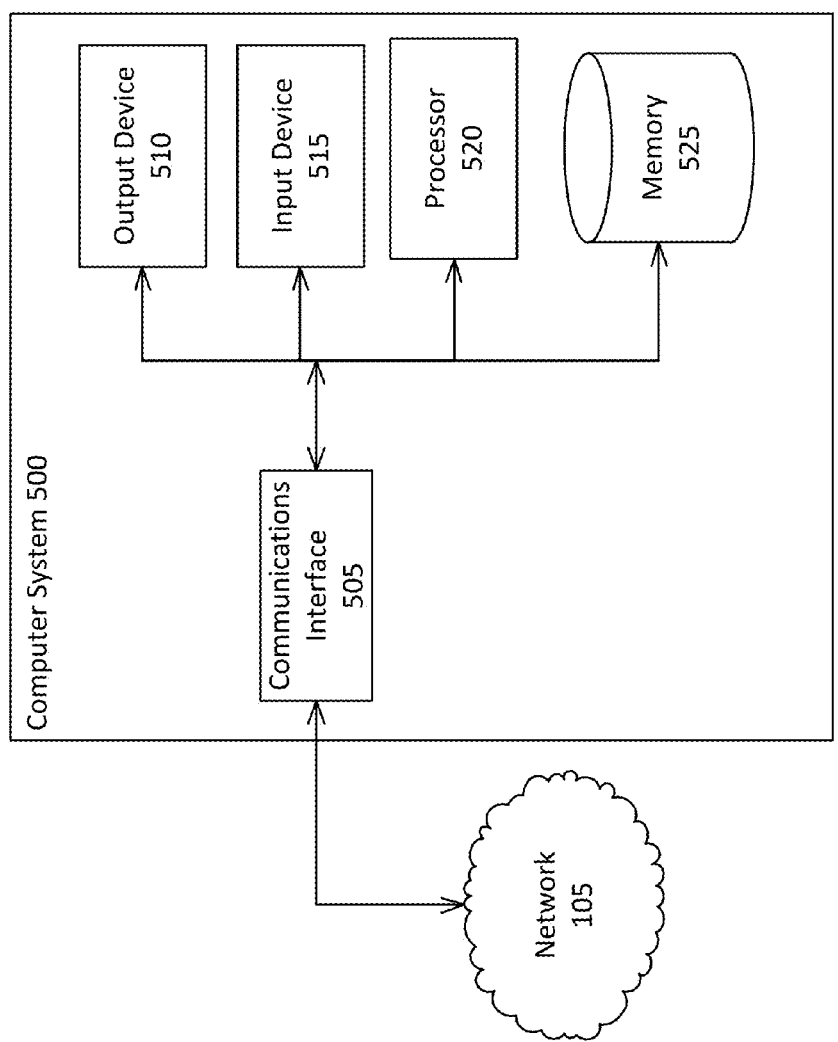

METHODS AND SYSTEMS FOR GENERATING A STABLE IDENTIFIER FOR NODES LIKELY INCLUDING PRIMARY CONTENT WITHIN AN INFORMATION RESOURCE

BACKGROUND

Information resources, such as web pages, can include primary content and content slots that serve as placeholders for third-party content items, such as creatives. When the web page is rendered on a user computing device, third-party content items are inserted in the content slots and provided for display alongside the primary content. The content slots in which third-party content items are inserted are typically defined manually in the web page code.

SUMMARY

At least one aspect is directed to a method of generating a stable identifier for nodes likely to include primary content of an information resource. A processor identifies, on an information resource, a plurality of content-related Document Object Model (DOM) nodes based on a primary content detection policy including one or more rules. The processor determines one or more container nodes containing one or more of the identified content-related DOM nodes. The processor generates, for each of the container nodes, one or more identifiers corresponding to the container node. The processor then determines, for each of the generated identifiers, one or more container nodes to which the identifier corresponds. The processor identifies, from the generated identifiers, a subset of the generated identifiers that correspond only to container nodes that contain the content-related DOM nodes and selects one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name. In some implementations, the stable class name includes any class name that does not end in a number.

In some implementations, selecting one of the identifiers of the subset as the stable identifier includes identifying an identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a system for generating a stable identifier for nodes likely to include primary content of an information resource includes a data processing system configured to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name. In some implementations, the stable class name includes any class name that does not end in a number.

In some implementations, selecting one of the identifiers of the subset as a stable identifier includes identifying an identifier of the identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a computer-readable storage medium has computer-executable instructions, which when executed by a computer, cause the computer to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a block diagram illustrating an implementation of a general architecture for a computer system that may be employed to implement various elements of the systems and methods described and illustrated herein.

DETAILED DESCRIPTION

Figure 1:
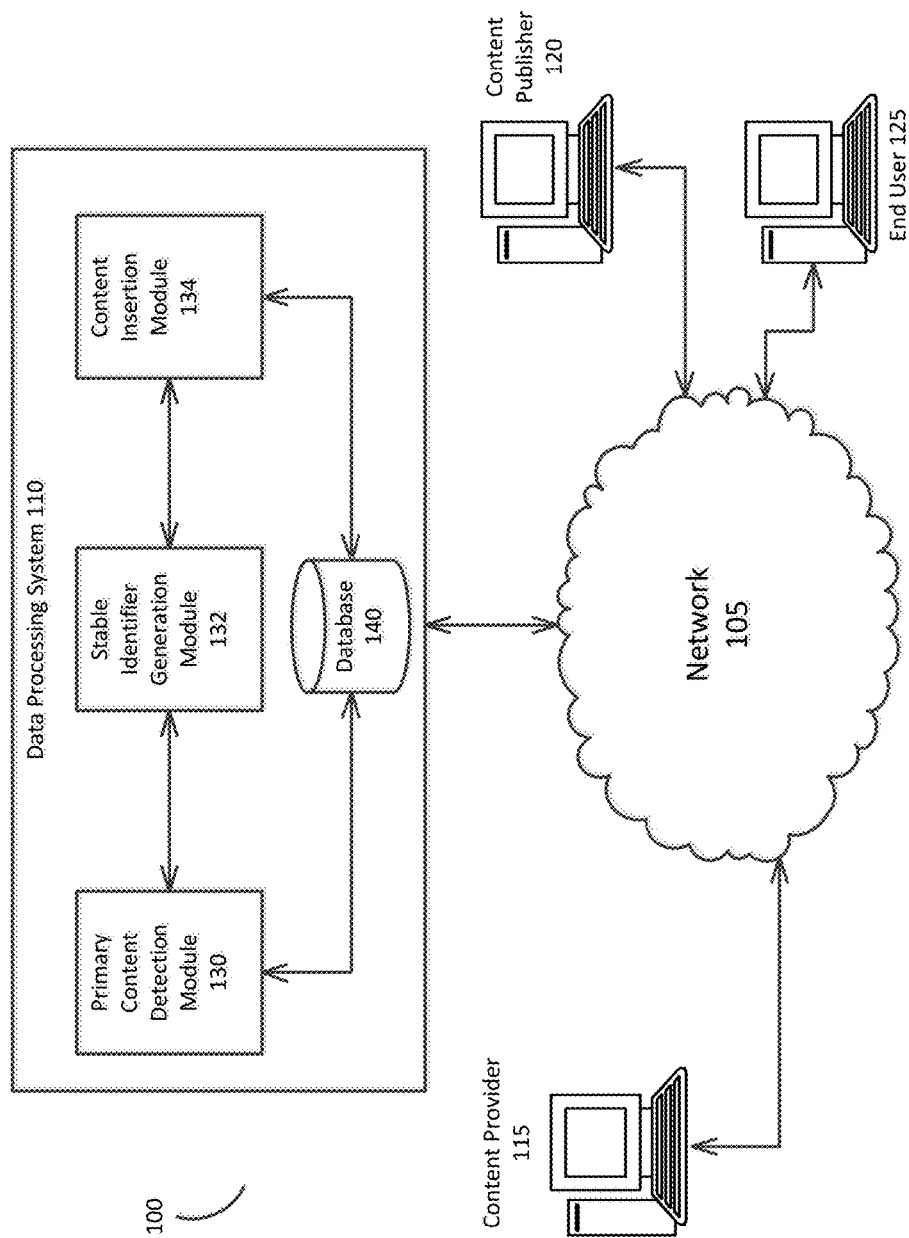
FIG. 1 is a block diagram depicting one implementation of an environment for automatically generating a stable identifier for primary content detected within an information resource, according to an illustrative implementation.

Following below are more detailed descriptions of various concepts related to, and implementations of, methods, apparatus, and systems for automatically generating a stable identifier for primary content detected within an information resource. The various concepts introduced above and discussed in greater detail below may be implemented in any of numerous ways, as the described concepts are not limited to any particular manner of implementation. Examples of specific implementations and applications are provided primarily for illustrative purposes.

The present disclosure relates to generating a stable identifier for primary content detected within an information resource. By detecting primary content, such as posts or articles, within an information resource, a data processing system can generate a stable identifier for the detected primary content. The stable identifier can be used to reference primary content on future renderings of the information resource. For example, once the data processing system generates a stable identifier for the primary content included in the information resource, the data processing system can dynamically insert creatives in the information resource when the information resource is rendered at a computing device.

Information resources are often very complicated. For example, many information resources include numerous images and distinct sections of text. The information resources can include menus, headers, sidebars, footers, ads, widgets as well as what might be considered the actual primary content. Although a user viewing the information resource can easily differentiate these different parts of the information resource and focus on the primary content, the process of automatically detecting primary content included in an information resource is much more challenging.

Primary content on information resources, such as web pages, can often be presented in one of two forms. In one form, the primary content can be presented as a list of posts. Each post is its own distinct piece of content about a certain subject, but together the posts make up the primary content of the web page. Conversely, in another form, the primary content can be presented as a single long form post or article.

Once the primary content on an information resource is identified, the primary content may generally be contained in a container associated with a stable identifier. The present disclosure provides methods and systems for automatically generating stable identifiers for the detected primary content of an information resource. The generated stable identifiers can be used to insert content slots for serving creatives or third-party content items on the information resource.

The present disclosure provides methods and systems for automatically detecting these pieces of primary content. With respect to the first form in which the content is presented as a list of posts, each of the posts may be identified as a distinct piece of content. Conversely, with respect to the second form in which the content is presented as a single post or article, the whole of the primary content should be detected as a single piece of content.

In addition to detecting the primary content, the present disclosure provides methods and systems for generating a stable identifier for the detected primary content. For example, each of the posts that together form the primary content, can be wrapped in an <ARTICLE class='post'> tag in the HTML source, so a stable identifier might be {tagName: 'ARTICLE', className: 'post'}. Using the second form in which the content is presented as a single post or article as another example, the post or article can be wrapped in a <DIV class='story-body'> tag in the HTML source, so a stable identifier might be {tagName: 'DIV', className: 'story-body'}.

These identifiers allow the posts or articles on a web page to be very quickly and efficiently accessed by JavaScript once the page has been rendered in a browser. This allows for creatives to be inserted within the primary content of a page dynamically. In one example, a creative can be inserted after the first paragraph of each post when the web page is presenting the primary content as a list of posts. In another example, a creative can be inserted after the first three paragraphs of an article when the web page is presenting the primary content as a single piece of content.

The present disclosure relates to methods and systems for generating stable identifiers for content sections of an information resource. A processor can be configured to identify, on an information resource, a plurality of content-related Document Object Model (DOM) nodes likely to include primary content based on an identifier associated with the nodes, determine one or more container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier.

FIG. 1 illustrates an system 100 for generating a stable identifier for primary content detected within an information resource via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one primary content detection module 130, at least one stable identifier generation module 132, at least one content insertion module 134 and at least one database 140. The primary content detection module 130, the stable identifier generation module 132 and the content insertion module 134 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The primary content detection module 130, the stable identifier generation module 132 and the content insertion module 134 can include or execute at least one computer program or at least one script. The primary content detection module 130, the stable identifier generation module 132 and the content insertion module 134 can be separate components, a single component, or part of the data processing system 110. The primary content detection module 130, the stable identifier generation module 132 and the content insertion module 134 can include combinations of software and hardware, such as one or more processors configured to execute one or more scripts to identify, on an information resource, a plurality of content-related Document Object Model (DOM) nodes likely to include primary content, determine one or more container nodes container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier, for instance.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing device 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The content provider computing devices 115, the content publisher computing device 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or advertiser can communicate with the data processing system 110 via the content provider computing device 115. In some implementations, the advertiser can communicate with the data processing system 110 via a user interface displayed on the user interface devices of the content provider computing device 115.

The primary content detection module 130 can be part of, or can include scripts executed by, one or more servers in the data processing system 110. In some implementations, the primary content detection module 130 can be designed, constructed or configured to identify, on an information resource, a plurality of content-related Document Object Model (DOM) nodes likely to include primary content. Examples of primary content can include posts, articles, or other content items that the web publisher has provided. Examples of content that may not be considered primary content can include advertisements, widgets, or links not related to the primary content. In some implementations, the primary content detection module 130 can be configured to identify all of the content-related Document Object Model (DOM) nodes included in the information resource. In some implementations, the primary content detection module 130 can identify content-related DOM nodes by inspecting the DOM tree of the information resource. The primary content detection module 130 can identify each node included within the information resource and determine whether the identified node is a content-related DOM node.

In some implementations, the primary content detection module 130 can determine that a DOM node is a content-related DOM node based on a primary content detection policy including one or more rules. In some implementations, the primary content detection module 130 can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title. In some implementations, the primary content detection module 130 can determine that a node is a content-related DOM node if the node contains content corresponding to a post or article, or any other content that the publisher of the information resource considers to be primary content. In some implementations, a node can be defined as an effective text node if the node is a text node containing visible text. In some implementations, a node can be defined as an effective text node if all of the children of the node are inline nodes and at least one of the node's children is an effective text node. In some implementations, a node can be defined as an effective link node if the node is an effective text node that is the descendent of an anchor tag, such as an A tag. In some implementations, the node can be defined as an effective link node if the node has at least one child and all of the node's children are effective links. In some implementations, a node can be defined as a title if the node is an effective text node and the node, or a descendent of the node is a header tag, such as an H1, H2, H3, H4, H5, or H6 tag. In some implementations, a node may be deemed to start with a title if the node is a title. In some implementations, the node may be deemed to start with a title if the node is not a paragraph and a title is encountered before a paragraph is encountered when traversing the node's subtree.

The primary content detection module 130 can be configured to determine, for each content-related DOM node, one or more container nodes containing one or more of the identified content-related DOM nodes. In some implementations, a node of the DOM tree may be identified as a container node if the node meets two criteria. The first criteria is that either the node has a tag type of ARTICLE or the node has a tag type of DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node is a post. Examples of CSS class types that indicate that the node is a post can include 'post' or 'typepost.'

In some implementations, the primary content detection module 130 can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the container node nearest to a given content-related DOM node can be the container node that contains the content-related DOM node and no other container nodes. In some implementations, the primary content detection module 130 can store a record of each identified content-related DOM node and the identity of the nearest container node that contained the identified content-related DOM node.

In some implementations, the primary content detection module 130 can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the primary content detection module 130 can maintain a list of container nodes. The primary content detection module 130 can include each of the container nodes determined for each of the content-related DOM nodes in the list. In some implementations, the primary content detection module 130 can also include each of the equivalent container ancestor nodes determined for each container node. In some implementations, the primary content detection module 130 can remove any duplicate nodes from the list such that the list of container nodes includes each of the determined container nodes and any equivalent container ancestor nodes corresponding to the determined container nodes.

The stable identifier generation module 132 can be part of, or can include scripts executed by, one or more servers in the data processing system 110. In some implementations, the stable identifier generation module 132 can be designed, constructed or configured to generate, for each of the container nodes included in the list of container nodes, one or more identifiers corresponding to the container node. In some implementations, the stable identifier generation module 132 can be configured to generate, for each of the container nodes included in the list, every identifier corresponding to the container node.

In some implementations, the stable identifier generation module 132 can generate an identifier based on the type of tag associated with the container node for which the stable identifier generation module 132 is generating the identifier. In some implementations, the stable identifier generation module 132 can generate an identifier based on the class name associated with the container node. In some implementations, the stable identifier generation module 132 can generate the identifier according to an identifier generation policy that includes one or more rules. In some implementations, to generate an identifier for a given container node, the stable identifier generation module 132 identifies the type of tag associated with the container node and a class name associated with the tag. In some implementations, the stable identifier generation module 132 can generate an identifier having only a tag name if the container node corresponds to an ARTICLE tag type. In some implementations, the tag name of the identifier can be ARTICLE. In some implementations, the stable identifier generation module 132 can generate an identifier having a tag name and an ID if the ID is stable. A stable ID can be any ID that does not end in a number In some implementations, the stable identifier generation module 132 can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the stable identifier generation module 132 can be configured to maintain a list of identifiers generated for the container nodes included in the list of container nodes. In some implementations, the stable identifier generation module 132 may remove any duplicates in the list of identifiers generated for the container nodes.

In some implementations, the stable identifier generation module 132 can be configured to sort the identifiers generated for the container nodes based on a preference policy. In some implementations, the preference policy can include one or more rules for sorting the potential identifiers. Generally, a good identifier generated by the stable identifier generation module 132 should be stable, should reliably identify all container nodes on the information resource that contain the nodes likely to include primary content and should not identify any other nodes included in the information resource. In some implementations, the stable identifier generation module 132 can be configured to compare the identifiers included in the list to sort the identifiers in order of preference.

In some implementations, to execute or implement the preference policy, the stable identifier generation module 132 can compare two or more first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the stable identifier generation module 132 identifies that none of the identifiers includes only a tag name, the stable identifier generation module 132 determines whether any of the two identifiers includes a tag name and an ID. Identifiers having a tag name and an ID are preferred over identifiers having a tag name without an ID. As such, if one of the identifiers has a tag name and an ID, that identifier will be ranked higher than the identifier not having an ID. If the stable identifier generation module 132 identifies that none of the identifiers includes a tag name and an ID, the stable identifier generation module 132 determines whether any of the two identifiers includes a tag name and a class name. Identifiers having a tag name and a class name are preferred over identifiers having a tag name without a class name. As such, if one of the identifiers has a tag name and a class name, that identifier will be ranked higher than the identifier not having a class name. If the stable identifier generation module 132 identifies that both of the identifiers includes a tag name and a class name, the stable identifier generation module 132 determines which of the identifiers has a more preferred class name. Identifiers having a more preferred class name are preferred over identifiers having a less preferred class name. As such, if one of the identifiers has a tag name and a more preferred class name, that identifier will be ranked higher than the identifier not having the more preferred class name. In some implementations, the class name 'post-container' is more preferred than the class names 'post' and 'type-post' and the class name 'post' is more preferred than the class name 'type-post.' If the stable identifier generation module 132 identifies that none of the identifiers includes a tag name with a preferred class name, the stable identifier generation module 132 determines that the identifier with the longer class name is preferred over an identifier with a shorter class name. As such, the identifier having a longer class name will be ranked higher than the identifier having a shorter class name. For example, an identifier having a tag name DIV and class name 'post' is preferred over an identifier having a tag type DIV and a class name 'another-class-name' since the class name 'post' is a preferred class name. In another example, an identifier having a tag name DIV and class name 'another-class-name' is preferred over an identifier having a tag type DIV and a class name 'class-name' since the class name 'another-class-name' is longer than the class name 'class-name.'

The stable identifier generation module 132 can be configured to associate each of the identifiers generated by the stable identifier generation module 132 to the container nodes determined by the primary content detection module 130. In some implementations, the stable identifier generation module 132 can construct a map that maps each generated identifier to all of the container nodes from which the stable identifier generation module 132 was able to generate the identifier. In some implementations, the identifiers can serve as keys in the constructed map.

In some implementations, the stable identifier generation module 132 can be configured to determine, for each of the generated identifiers, one or more container nodes to which the identifier corresponds. In some implementations, the stable identifier generation module 132 can be configured to perform, for each identifier, a lookup in the DOM tree of the information resource to identify all nodes that are referenced by the identifier. For each of the identified nodes corresponding to the identifier, the stable identifier generation module 132 can determine that the identified node is either in the list of container nodes maintained by the primary content detection module 130 or that the node meets the criteria for being identified as a container node. In response to determining that the identified node is not on the list of container nodes or does not meet the criteria for being identified as a container node, the stable identifier generation module 132 can disregard the identifier as a stable identifier and remove the identifier from the list of identifiers. Conversely, in response to determining that the identified node is either on the list of container nodes or meets the criteria for being identified as a container node, the stable identifier generation module 132 can determine a content identification content identification score for the identifier. The content identification score can indicate how well the identifier identifies posts, articles or other primary content on the information resource. In some implementations, the content identification score can indicate an ability of the identifier to identify primary content.

In some implementations, the stable identifier generation module 132 can be configured to determine the content identification score based on a number of contents of the container nodes to which the identifier is associated. In some implementations, the stable identifier generation module 132 can determine the content identification score of each identifier based on a first number of characters in nodes likely to include primary content that are contained the container nodes associated with the identifier and a second number of characters included within the container nodes associated with the identifier. In some implementations, the stable identifier generation module 132 can determine the content identification score of each identifier based on a first number of nodes likely to include primary content that are contained in the container nodes associated with the identifier and a second number of paragraphs included within the information resource. In some implementations, the stable identifier generation module 132 can determine the content identification score of each identifier based on a first number of characters in nodes likely to include primary content that are contained in the container nodes associated with the identifier and a second number of characters included within all nodes likely to include primary content that are included within the information resource.

In some implementations, the stable identifier generation module 132 can be configured to determine the content identification score based on the following formula:

$$S = \frac{C_{PARA}}{C_{TOTAL}} + K_1 \frac{P_{CONTAINED}}{P_{TOTAL}} + K_2 \frac{D_{CONTAINED}}{D_{TOTAL}}$$

where:
$C_{PARA}$ is the number of characters in nodes likely to include primary content that are contained in container nodes associated with the potential identifier;
$C_{TOTAL}$ is the total number of characters in container nodes associated with the potential identifier;
$P_{CONTAINED}$ is the number of nodes likely to include primary content that are contained in container nodes associated with the potential identifier;

$P_{TOTAL}$ is the total number of nodes likely to include primary content on the information resource;

$D_{CONTAINED}$ is the number of characters contained in nodes likely to include primary content that are contained in container nodes associated with the potential identifier;

$D_{TOTAL}$ is the number of characters contained in all nodes likely to include primary content on the information resource;

$K_1$ is a tunable parameter (for example, 0.5); and $K_2$ is a tunable parameter (for example, 1).

The stable identifier generation module 132 can be configured to identify the identifier having the largest content identification score. The stable identifier generation module 132 can then select the identifier from the plurality of generated identifiers as the stable identifier for identifying container nodes that contain nodes that are likely to include primary content.

In some implementations, the stable identifier generation module 132 can be configured to store the identified potential identifier with the information resource. In some implementations, the identified potential identifier can be associated with each of the container nodes including primary content. In this way, when the information resource is accessed for rendering at a later time, the identifiers identifying the container nodes including the primary content can be used to easily identify the container nodes including the primary content. In some implementations, creatives can be inserted near the nodes likely to include primary content, thereby improving conversion rates of the creatives.

The content insertion module 134 can be part of, or can include scripts executed by, one or more servers in the data processing system 110. In some implementations, the content insertion module 134 can be designed, constructed or configured to insert a creative between adjacent container nodes that contain nodes likely to include primary content. In some implementations, the content insertion module 134 can identify the container nodes using the stable identifier selected by the stable identifier generation module 132. In some implementations, the content insertion module 134 can request access to the information resource, identify the generated stable identifier and identify the container nodes associated with the generated stable identifier. The content insertion module 134 can then insert creatives adjacent to or near these container nodes. As creatives displayed near primary content tend to have a higher conversion rate, the content insertion module 134 can increase the conversion rates of the creatives inserted the content insertion module 134 on the information resource.

Figure 2A:
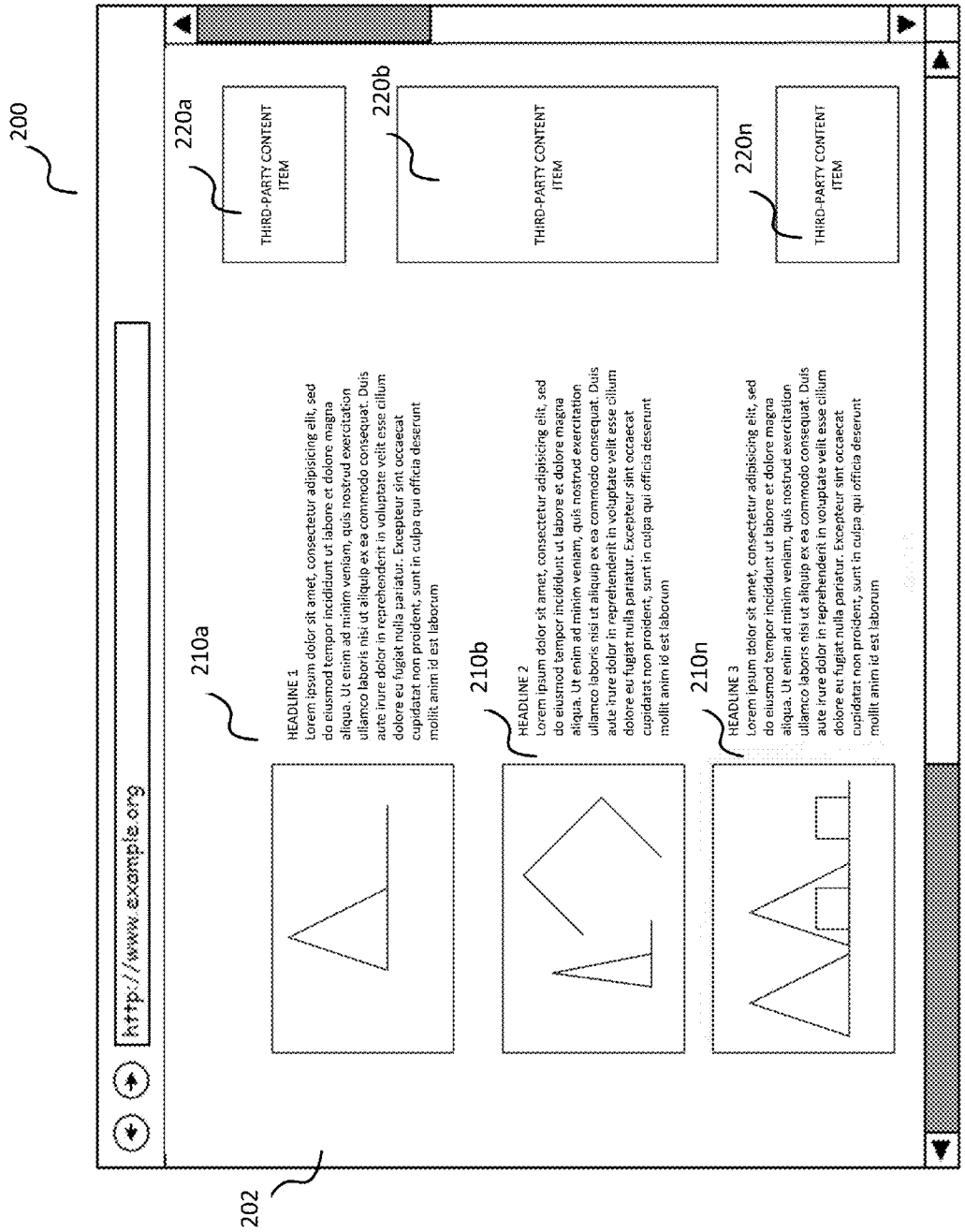
FIG. 2A is a screenshot of a display of an information resource including a plurality of posts.
Figure 2B:
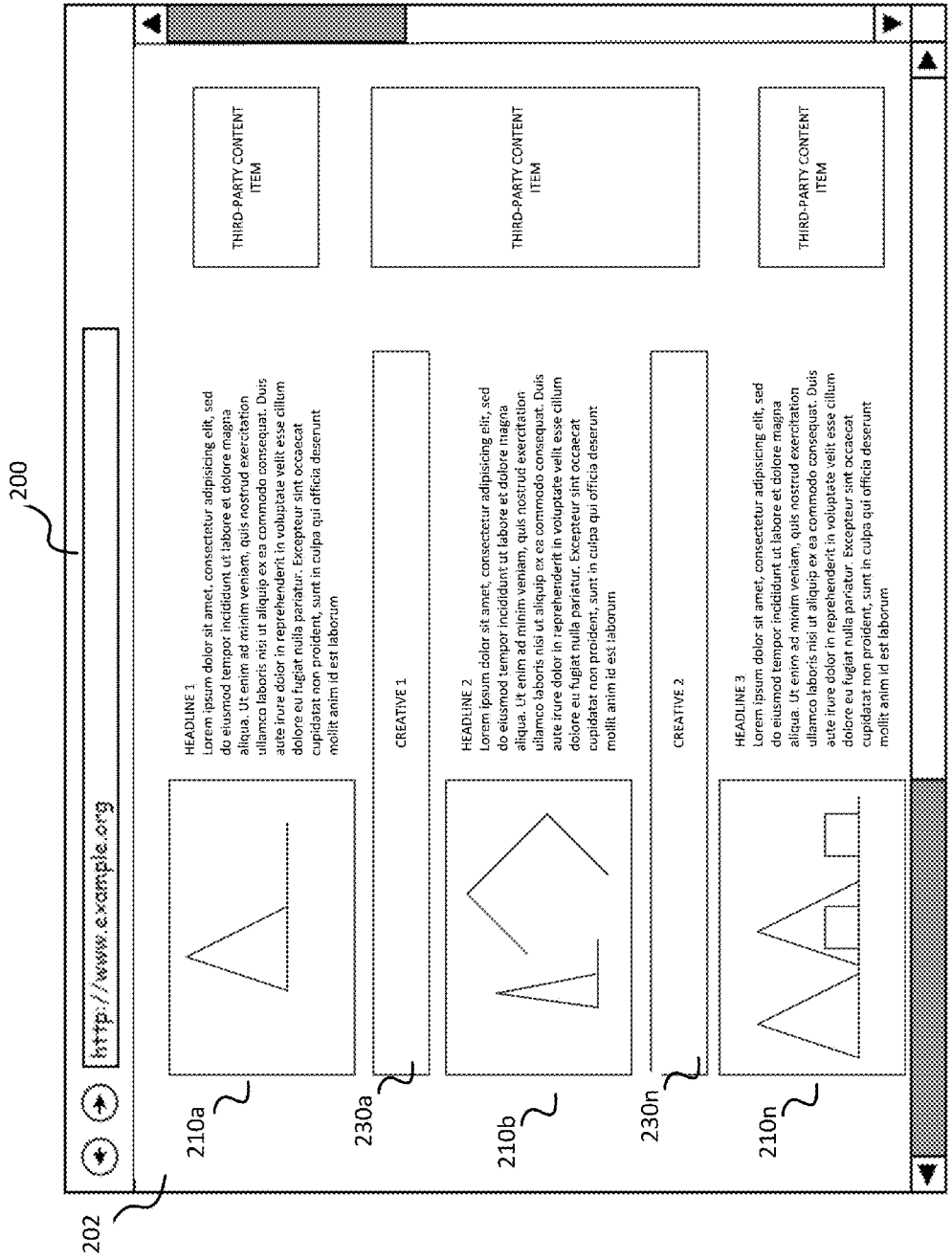
FIG. 2B is a screenshot of a display of the information resource shown in FIG. 2A but including a plurality of creatives inserted between the plurality of posts.

Referring now briefly to FIGS. 2A and 2B, FIG. 2A shows a screenshot 200 of an information resource 202 displayed within a browser window. The information resource 202 includes primary content and third-party content 220a-n. The primary content comprises a plurality of posts 210a-n, each having an associated image, a headline, and corresponding text. The stable identifier generation module 132 described in FIG. 1 can be configured to associate a stable identifier with the DOM tree of the information resource 202 and identify container nodes containing each of the plurality of posts 210a-n. The content insertion module 134 can be configured to use the stable identifier associated with the information resource 202 to insert creatives in between the plurality of posts 210a-n. FIG. 2B shows a screenshot of the information resource shown in FIG. 2A that includes creatives 230a-n between the plurality of posts 210a-n.

In some implementations, the content insertion module 134 can be configured to include a script or other software construct in the DOM tree of the information resource such that when the information resource is rendered on a browser executing on a computing device, the information resource is rendered with creatives inserted in between adjacent posts of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent posts or near one or more posts.

Figure 3A:
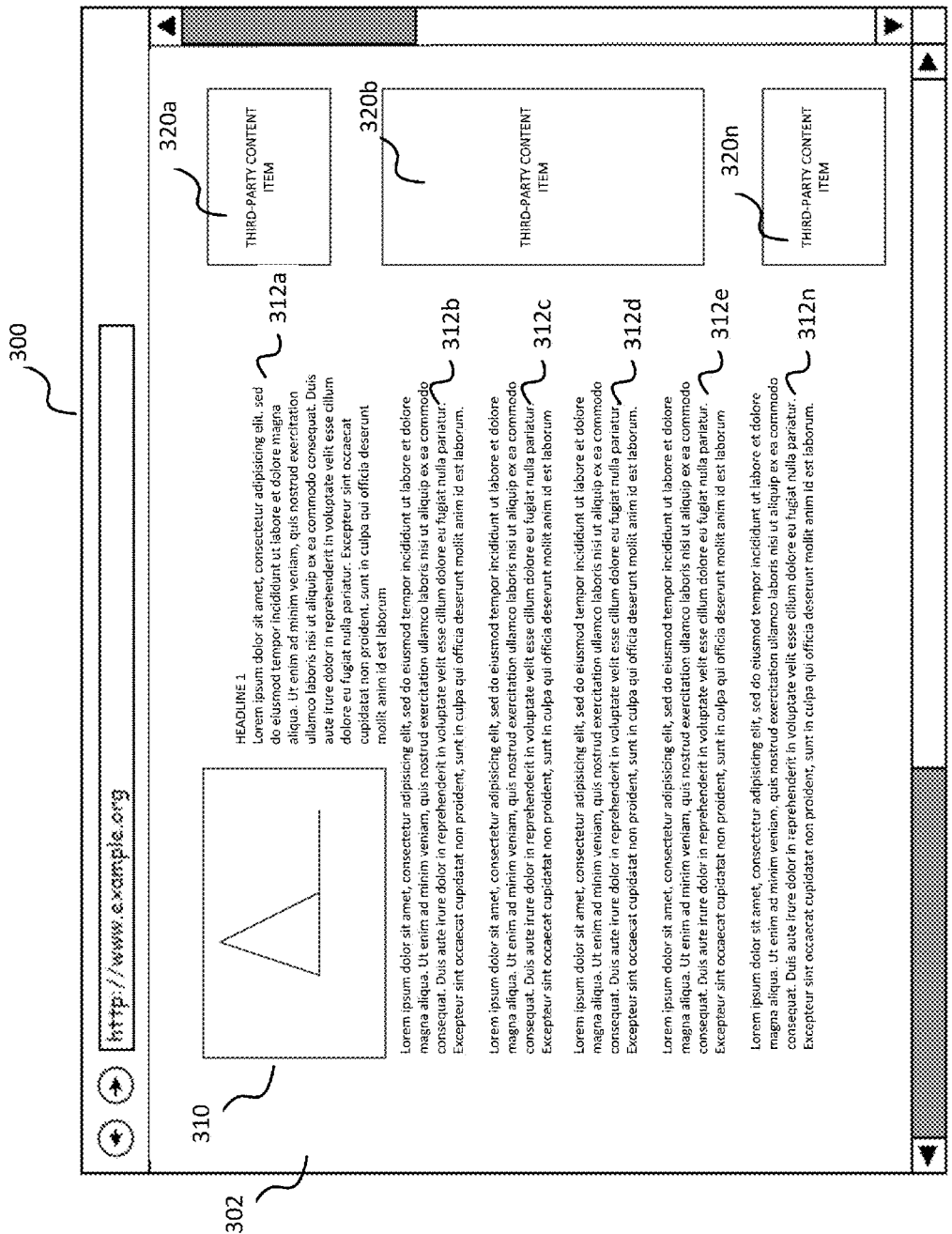
FIG. 3A is a screenshot of a display of an information resource including an article including a plurality of paragraphs.
Figure 3B:
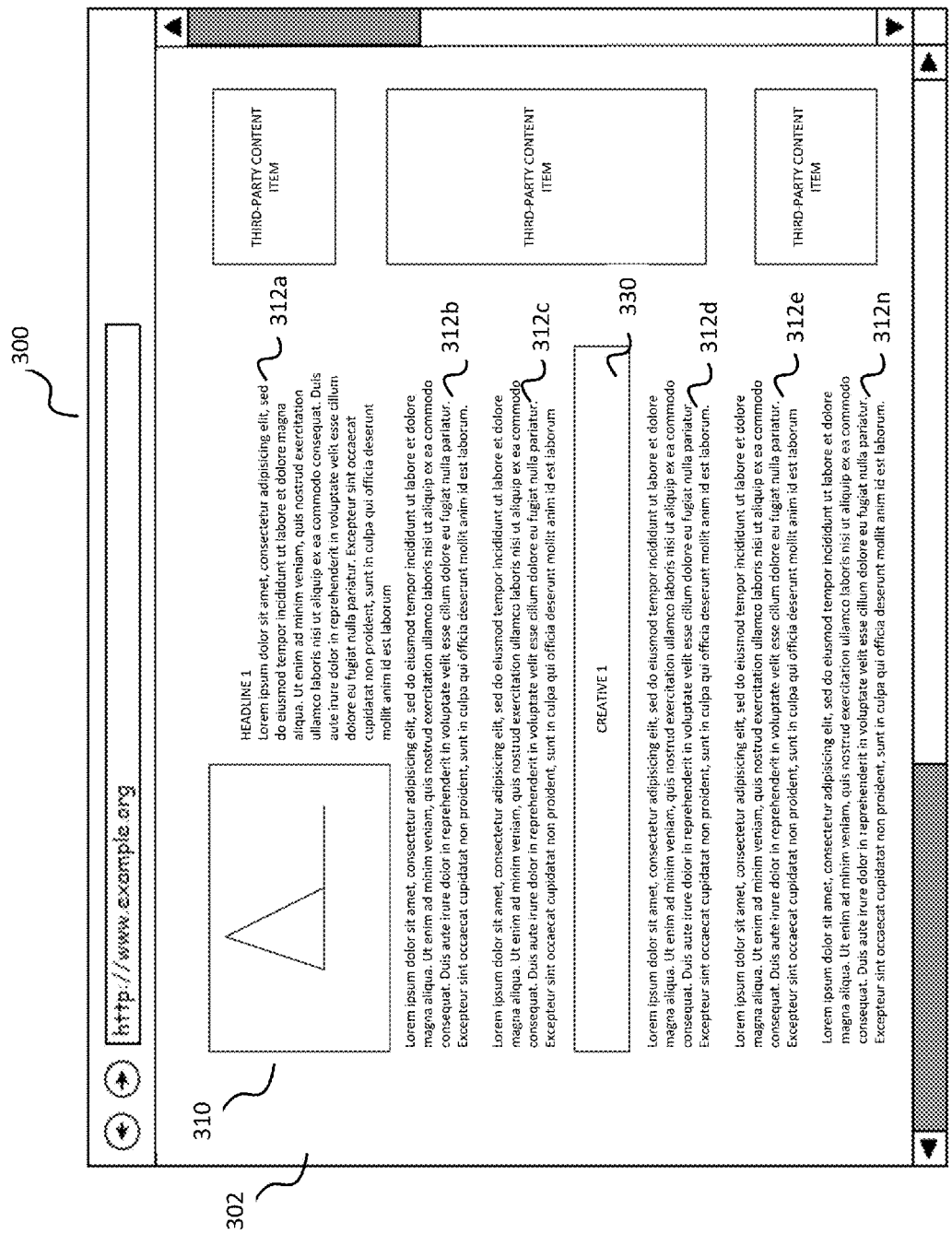
FIG. 3B is a screenshot of a display of the information resource shown in FIG. 3A but including a creative inserted between the plurality of paragraphs.

Referring now briefly to FIGS. 3A and 3B, FIG. 3A shows a screenshot 300 of an information resource 302 displayed within a browser window. The information resource 302 includes primary content and third-party content 320a-n. The primary content comprises an article 310 having an associated image, a headline, and corresponding text in multiple paragraphs 312a-312n. The stable identifier generation module 132 described in FIG. 1 can be configured to associate a stable identifier with the DOM tree of the information resource 302 and identify container nodes containing each of the plurality of paragraphs 312a-n. The content insertion module 134 can be configured to use the stable identifier associated with the information resource 302 to insert creatives in between or adjacent to the plurality of paragraphs 312a-n. FIG. 3B shows a screenshot of the information resource shown in FIG. 3A that includes a creative 330 between two of the paragraphs 312a-n.

In some implementations, the content insertion module 134 can be configured to include a script or other software construct in the DOM tree of the information resource such that when the information resource is rendered on a browser executing on a computing device, the information resource is rendered with creatives inserted in between adjacent paragraphs of an article of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent paragraphs or near one or more paragraphs.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store the DOM trees of one or more information resources, lists of container nodes, lists of identifiers associated with the container nodes, maps associating the identifiers with the container nodes, content identification scores of the potential identifiers, as well as the identity of the stable identifier selected to identify the container nodes of the information resource, amongst others. It should be appreciated that the data processing system 110 can include one or more additional modules to provide some or all of the features described herein as well as other additional features.

Figure 4:
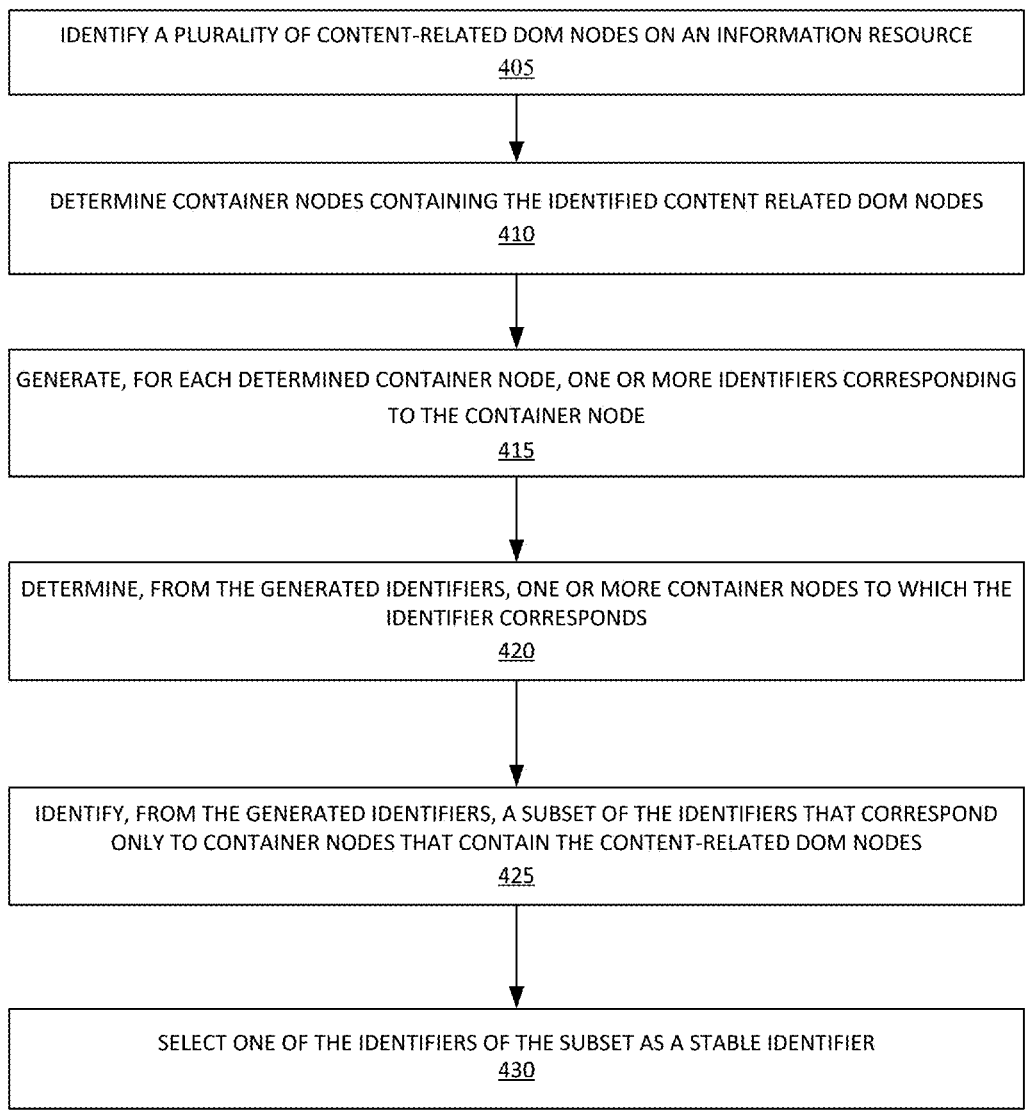
FIG. 4 is a flow diagram depicting one implementation of the steps taken to generate a stable identifier for primary content detected within an information resource.

FIG. 4 is a flow diagram depicting one implementation of the steps taken to render functional extensions with a landing page of a creative. In particular, FIG. 4 illustrates a flow diagram depicting a method 400 for generating a stable identifier for nodes likely to include primary content of an information resource is disclosed. A processor identifies, on an information resource, a plurality of content-related Document Object Model (DOM) nodes likely to include primary content (BLOCK 405). The processor determines one or more container nodes containing one or more of the identified content-related DOM nodes (BLOCK 410). The processor generates, for each of the container nodes, one or more identifiers corresponding to the container node (BLOCK 415). The processor determines, for each of the generated identifiers, one or more container nodes to which the identifier corresponds (BLOCK 420). The processor then determines, from the generated identifiers, a subset of the identifiers that correspond only to container nodes that contain the content-related DOM nodes (BLOCK 425). The processor then selects one of the identifiers of the subset as a stable identifier (BLOCK 430).

In further detail, the processor can identify, on an information resource, a plurality of content-related Document Object Model (DOM) nodes likely to include primary content (BLOCK 405). Examples of primary content can include posts, articles, or other content items that the web publisher has provided. In some implementations, the processor can inspect the DOM tree of an information resource and identify all of the content-related Document Object Model (DOM) nodes included in the information resource. In some implementations, the processor can identify each node included within the information resource and determine whether the identified node is a content-related DOM node. In some implementations, the processor can identify a node by inspecting the DOM tree for tags. A tag associated with a node can indicate the type of node.

In some implementations, the processor can determine that a node is a content-related DOM node based on a primary content detection policy including one or more rules. In some implementations, the processor can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title.

The processor can determine one or more container nodes containing one or more of the identified content-related DOM nodes (BLOCK 410). In some implementations, the processor can determine, for each content-related DOM node, one or more container nodes containing one or more of the identified content-related DOM nodes. In some implementations, a node of the DOM tree may be identified as a container node if the node meets two criteria. The first criteria is that either the node corresponds to an ARTICLE or the node corresponds to one of a DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node includes primary content, such as a post. Examples of CSS class types that indicate that the node is a post can include 'post' or 'typepost.'

In some implementations, the processor can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the processor can store a record of each identified content-related DOM node and the identity of the nearest container node that contained the identified content-related DOM node.

In some implementations, the processor can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the processor can maintain a list of container nodes. The primary content detection module can include each of the container nodes determined for each of the content-related DOM nodes in the list. In some implementations, the processor can also include each of the equivalent container ancestor nodes determined for each container node. In some implementations, the processor can remove any duplicate nodes from the list such that the list of container nodes includes each of the determined container nodes and any equivalent container ancestor nodes corresponding to the determined container nodes.

The processor can generate, for each of the container nodes, one or more identifiers corresponding to the container node (BLOCK 415). In some implementations, the processor can generate, for each of the container nodes included in the list of container nodes, one or more identifiers corresponding to the container node. In some implementations, the stable identifier generation module can be configured to generate, for each of the container nodes included in the list, every identifier corresponding to the container node.

In some implementations, the processor can generate an identifier based on the tag associated with the container node for which the processor is generating the identifier. In some implementations, the processor can generate an identifier based on the class name associated with the container node. In some implementations, the processor can generate the identifier according to an identifier generation policy that includes one or more rules. In some implementations, to generate an identifier for a given container node according to the identifier generation policy, the processor identifies the type of tag associated with the container node and a class name associated with the tag. In some implementations, the processor can generate an identifier having only a tag name if the container node corresponds to an ARTICLE tag type. In some implementations, the tag name of the identifier can be ARTICLE. In some implementations, the processor can generate an identifier having a tag name and an ID if the ID is stable. A stable ID can be any ID that does not end in a number In some implementations, the processor can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the processor can maintain a list of identifiers generated for the container nodes included in the list of container nodes. In some implementations, the processor may remove any duplicates in the list of identifiers generated for the container nodes. In some implementations, the processor can sort the identifiers generated for the container nodes based on a preference policy. In some implementations, the preference policy can include one or more rules for sorting the potential identifiers.

In some implementations, the processor can arrange a plurality of the generated identifiers of the list of identifiers in order of highest preference to lowest preference. The processor can compare two or more identifiers at a time and determine which of the identifiers has a higher preference. In some implementations, the processor can first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the processor determines that none of the identifiers being compared includes only a tag name, the processor can determine whether any of the two identifiers includes a tag name and an ID. Identifiers having a tag name and an ID are preferred over identifiers having a tag name without an ID. As such, if one of the identifiers has a tag name and an ID, that identifier will be ranked higher than the identifier not having an ID. If the processor determines that none of the identifiers includes a tag name and an ID, the processor determines whether any of the two identifiers includes a tag name and a class name. Identifiers having a tag name and a class name are preferred over identifiers having a tag name without a class name. As such, if one of the identifiers has a tag name and a class name, the processor will rank that identifier higher than the identifier not having a class name. If the processor identifies that both of the identifiers includes a tag name and a class name, the processor can determine which of the identifiers has a more preferred class name. Identifiers having a more preferred class name are preferred over identifiers having a less preferred class name. As such, if one of the identifiers has a tag name and a more preferred class name, the processor will rank that identifier higher than the identifier not having the more preferred class name. In some implementations, the class name 'post-container' is more preferred than the class names 'post' and 'type-post' and the class name 'post' is more preferred than the class name 'type-post.' If the processor identifies that none of the identifiers includes a tag name with a preferred class name, the processor can determine that the identifier with the longer class name is preferred over an identifier with a shorter class name. As such, the identifier having a longer class name will be ranked higher than the identifier having a shorter class name.

The processor determines, for each of the generated identifiers, one or more container nodes to which the identifier corresponds (BLOCK 420). In some implementations, the processor can associate each of the identifiers generated by the processor to the container nodes to determine a subset of identifiers that correspond only to container nodes that contain the content-related DOM nodes. In some implementations, the processor can map each generated identifier to all of the container nodes from which the processor could have possibly generated the identifier. This is because multiple container nodes may have the same tag types or ids or class names, which result in container nodes having the same tag types or ids or class names generating identical identifiers. In some implementations, the identifiers can serve as keys in a map constructed to map the identifiers to each of the container nodes. In some implementations, the processor can perform, for each identifier, a lookup in the DOM tree of the information resource to identify all nodes that can be referenced by the identifier.

The processor can determine, from the generated identifiers, a subset of the identifiers that correspond only to container nodes that contain the content-related DOM nodes (BLOCK 425). In some implementations, the processor can perform, for each identifier, a lookup in the DOM tree of the information resource to identify all nodes that can be referenced by the identifier. In some implementations, nodes that can be referenced by the identifier include nodes that have characteristics (for example, tag type, id, class name) that would cause the processor to generate the identifier based on the characteristics of the node. For each of the identified nodes corresponding to the identifier, the processor can determine that the identified node is either in a list of container nodes maintained by the processor or that the node meets the criteria for being identified as a container node. In response to determining that the identified node is not on the list of container nodes or does not meet the criteria for being identified as a container node, the processor can disregard the identifier as a stable identifier and remove the identifier from the list of identifiers. Conversely, in response to determining that the identified node is either on the list of container nodes or meets the criteria for being identified as a container node, the processor can include the identifier as a potential stable identifier and as such, determine a content identification score for the identifier. The content identification score can indicate how well the identifier identifies posts, articles or other primary content on the information resource.

The processor can select one of the identifiers of the subset as a stable identifier (BLOCK 430). In some implementations, the processor can determine a content identification score for each of the potential identifiers. In some implementations, the processor can determine the content identification score based on a number of contents of the container nodes to which the identifier is associated. In some implementations, the processor can determine the content identification score of each identifier based on a first number of characters in nodes likely to include primary content (for example, paragraph nodes) that are contained the container nodes associated with the identifier and a second number of characters included within the container nodes associated with the identifier. In some implementations, the processor can determine the content identification score of each identifier based on a first number of nodes likely to include primary content that are contained in the container nodes associated with the identifier and a second number of paragraphs included within the information resource. In some implementations, the processor can determine the content identification score of each identifier based on a first number of characters in nodes likely to include primary content that are contained in the container nodes associated with the identifier and a second number of characters included within all nodes likely to include primary content that are included within the information resource.

The processor can identify the identifier having the largest content identification score. The processor can then select the identifier having the highest content identification score as the stable identifier for identifying container nodes that contain nodes that are likely to include primary content. In some implementations, the processor can store the identity of the stable identifier with the information resource. In this way, the processor can identify posts or articles or nodes likely to include primary content using the stable identifier, which can identify the container nodes corresponding to the posts or articles or nodes likely to include primary content. In some implementations, the processor inserts a creative in between adjacent container nodes corresponding to the stable identifier responsive to receiving a request to serve the information resource.

The following is an implementation of a portion of a DOM tree of an information resource. As shown below, some of the nodes are followed by annotations indicating the type of node. For ease of reference, the annotations begin with II.

<div id='postOne' class='content-entry'>//Ancestor Container Node
  <div class='left-align'>//Container Node
  <h2>Post 1 Title</h2>
  <p>Paragraph 1 . . . blaa blaa blaa . . . end.</p>//DOM node likely to contain primary content
<p>Paragraph 2 . . . blaa blaa blaa . . . end.</p>//DOM node likely to contain primary content
  </div>
</div>
<div id='postTwo' class='content-entry'>//Ancestor Container Node
  <div class='left-align'>//Container Node
  <h2>Post 2 Title</h2>
  <p>Paragraph 1 . . . blaa blaa blaa . . . end.</p>//DOM node likely to contain primary content
  <p>Paragraph 2 . . . blaa blaa blaa . . . end.</p>//DOM node likely to contain primary content
  </div>
</div>
<div id='link-box' class='left-align'>//Other HTML node on information resource (Not a post)
  <a href='#'>Link 1</a>
  <a href='#'>Link 2</a>
</div>

Using the DOM tree above, the processor can generate the following identifiers based on the container nodes. The processor can generate the following identifier for the container nodes.
{
  tagName: 'DIV',
  className: 'left-align'
}

By considering ancestor container nodes, the processor can expand the list of identifiers to the following four identifiers:
{
  tagName: 'DIV',
  className: 'left-align'
}
{
  tagName: 'DIV',
  id: 'postOne'
}
{
  tagName: 'DIV',
  id: 'postTwo'
}
{
  tagName: 'DIV',
  className: 'content-entry'
}

The processor would then discard the {tagName: 'DIV', className: 'left-align' } identifier since it is a container node that does not contain a node likely to contain primary content. In particular, the {tagName: 'DIV', className: 'left-align' } identifier references the following container:

<div id='link-box' class='left-align'>
  <a href='#'>Link 1</a>
  <a href='#'>Link 2</a>
</div>.

The processor would then arrange the remaining three identifiers according to a preference order and select the {tagName: 'DIV', className: 'content-entry'} identifier as the stable identifier as this identifier would have the highest score.

FIG. 5 shows the general architecture of an illustrative computer system 500 that may be employed to implement any of the computer systems discussed herein (including the system 100 and its components such as the primary content detection module 130, the stable identifier generation module 132 and the content insertion module 134) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 100 such as the primary content detection module 130, the stable identifier generation module 132 and the content insertion module 134.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 525 to store information related to one or more creatives, one or more information resources generated for the creatives and one or more functional extensions generated for rendering with content of landing pages associated with the creatives. The memory 525 can include the database 140. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The primary content detection module 130, the stable identifier generation module 132 and the content insertion module 134 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the primary content detection module 130, the stable identifier generation module 132 and the content insertion module 134 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any information resource. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   identifying, by a processor, on an information resource comprising primary content and third-party content, a plurality of content-related Document Object Model (DOM) nodes based on a primary content detection policy including one or more rules, the plurality of content-related DOM nodes associated with the primary content;
   determining, by the processor, one or more container nodes containing one or more of the identified content-related DOM nodes;
   generating, for each of the container nodes, one or more identifiers corresponding to the container node;
   determining, for each of the generated identifiers, one or more container nodes to which the identifier corresponds;
   identifying, from the generated identifiers, a subset of the generated identifiers that correspond only to container nodes that contain the content-related DOM nodes;
   determining, for each identifier of the subset, a content identification score based on a measurement of text data included within the container nodes associated with the identifier of the subset, the content identification score indicating an ability of the identifier to identify the primary content on the information resource; and
   selecting, by the processor, one of the identifiers of the subset as a stable identifier to identify the primary content based on the content identification score of each identifier of the subset, wherein identifying the primary content is used to insert the third-party content into the information resource.

2. The method of claim 1, wherein determining the container nodes containing the plurality of content-related DOM nodes includes determining, for a content-related DOM node of the plurality of content-related DOM nodes, a container node of the container nodes that is nearest to the content-related DOM node contained by the container node.

3. The method of claim 2, wherein determining the container node nearest to the content-related DOM node includes identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name.

4. The method of claim 1, wherein selecting one of the identifiers of the subset as the stable identifier includes identifying an identifier of the subset including only a tag name.

5. The method of claim 1, wherein determining the content identification score of each identifier of the subset includes determining a first number of characters in paragraphs included within the container nodes associated with the identifier of the subset and a second number of characters included within the container nodes associated with the identifier of the subset.

6. The method of claim 1, wherein determining the content identification score of each identifier of the subset includes determining a first number of paragraphs included within the container nodes associated with the identifier of the subset and a second number of paragraphs included within the information resource.

7. The method of claim 1, wherein determining the content identification score of each identifier of the subset includes determining a first number of characters in paragraphs included within the container nodes associated with the identifier of the subset and a second number of characters included within all paragraphs included within the information resource.

8. The method of claim 1, further comprising storing, by the processor, the identity of the stable identifier with the information resource.

9. The method of claim 8, further comprising inserting a creative in between adjacent container nodes corresponding to the stable identifier responsive to receiving a request to serve the information resource.

10. A system comprising:
    a data processing system having a memory and one or more hardware processors, the data processing system configured to:
      identify, on an information resource comprising primary content and third-party content, a plurality of content-related Document Object Model (DOM) nodes based on a primary content detection policy including one or more rules, the plurality of DOM nodes associated with the primary content;
      determine one or more container nodes container nodes containing one or more of the identified content-related DOM nodes;
      generate, for each of the container nodes, one or more identifiers corresponding to the container node;

determine, for each of the generated identifiers, one or more container nodes to which the identifier corresponds;

identify, from the generated identifiers, a subset of the generated identifiers that correspond only to container nodes that contain the content-related DOM nodes;

determine, for each identifier of the subset, a content identification score based on a measurement of text data included within the container nodes associated with the identifier of the subset, the content identification score indicating an ability of the identifier to identify the primary content on the information resource; and select one of the identifiers of the subset as a stable identifier to identify the primary content based on the content identification score of each identifier of the subset, wherein identifying the primary content is used to insert the third-party content into the information resource.

11. The system of claim 10, wherein to determine the container nodes containing the plurality of content-related DOM nodes, the data processing system is configured to determine, for a content-related DOM node of the plurality of content-related DOM nodes, a container node of the container nodes that is nearest to the content-related DOM node contained by the container node.

12. The system of claim 10, wherein to determine the container node nearest to the content-related DOM node, the data processing system is configured to identify one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name.

13. The system of claim 12, wherein the stable class name includes any class name that does not end in a number.

14. The system of claim 10, wherein to select one of the identifiers of the subset as the stable identifier, the data processing system is configured to identify an identifier of the potential identifiers including only a tag name.

15. The system of claim 10, wherein to determine the content identification score of each identifier of the subset, the data processing system is configured to determine a first number of characters in paragraphs included within the container nodes associated with the identifier of the subset and a second number of characters included within the container nodes associated with the identifier of the subset.

16. The system of claim 10, wherein the data processing system is further configured to store the identity of the stable identifier with the information resource.

17. The system of claim 10, wherein the data processing system is further configured to insert a creative in between adjacent container nodes corresponding to the stable identifier responsive to receiving a request to serve the information resource.

18. A non-transitory computer-readable storage medium having computer-executable instructions stored thereon, which when executed by a computer, cause the computer to:

identify, on an information resource comprising primary content and third-party content, a plurality of content-related Document Object Model (DOM) nodes based on a primary content detection policy including one or more rules, the plurality of content-related DOM nodes associated with the primary content;

determine one or more container nodes container nodes containing one or more of the identified content-related DOM nodes;

generate, for each of the container nodes, one or more identifiers corresponding to the container node;

determine, for each of the generated identifiers, one or more container nodes to which the identifier corresponds;

identify, from the generated identifiers, a subset of the generated identifiers that correspond only to container nodes that contain the content-related DOM nodes;

determine, for each identifier of the subset, a content identification score based on a measurement of text data included within the container nodes associated with the identifier of the subset, the content identification score indicating an ability of the identifier to identify the primary content on the information resource; and select one of the identifiers of the subset as a stable identifier to identify the primary content based on the content identification score of each identifier of the subset, wherein identifying the primary content is used to insert the third-party content into the information resource.

* * * * *